United States Patent
Tanaka

(10) Patent No.: US 6,707,194 B2
(45) Date of Patent: Mar. 16, 2004

(54) MOTOR ACTUATION DEVICE FOR CAMERA

(75) Inventor: Yasuhiko Tanaka, Saitama (JP)

(73) Assignee: Fuji Photo Optical Co., Ltd., Saitama (JP)

(*) Notice: Subject to any disclaimer, the term of this patent is extended or adjusted under 35 U.S.C. 154(b) by 125 days.

(21) Appl. No.: 09/971,024

(22) Filed: Oct. 5, 2001

(65) Prior Publication Data

US 2002/0047408 A1 Apr. 25, 2002

(30) Foreign Application Priority Data

Oct. 5, 2000 (JP) .................................... 2000-306250

(51) Int. Cl.[7] ............................. H02K 7/10; G03B 13/10
(52) U.S. Cl. ...................... 310/83; 310/68 B; 396/87; 396/133
(58) Field of Search ..................... 396/87, 133, 144, 396/418; 310/68 B, 83

(56) References Cited

U.S. PATENT DOCUMENTS 5,121,153 A * 6/1992 Yamada et al. ............ 396/104
6,255,751 B1 * 7/2001 Hoffmann .................... 310/83
6,404,988 B1 * 6/2002 Tanabe ......................... 396/62

FOREIGN PATENT DOCUMENTS

| JP | 05-011322 | 1/1993 |
| JP | 09-274229 | 10/1997 |

* cited by examiner

Primary Examiner—Thomas M. Dougherty
Assistant Examiner—Judson H. Jones
(74) Attorney, Agent, or Firm—Young & Thompson

(57) ABSTRACT

A motor actuation device is constructed of a motor a reduction gear train and a detection mechanism. The reduction gear train includes a worm gear and a worm wheel. The worm gear is fixed to a rotary shaft of the motor and meshes with the worm wheel. The worm wheel transmits the rotation of the motor to the lens barrel to slide it along an optical axis. The detection mechanism includes a first spur gear, an idle gear, a second spur gear, an impeller and a photo interrupter. The first spur gear is molded with the worm gear integrally. The idle gear meshes with the first spur gear and the second spur gear. When the motor causes the rotation, a blade of the impeller passes in the photo interrupter and a pulse is generated from the photo interrupter.

10 Claims, 6 Drawing Sheets

MOTOR ACTUATION DEVICE FOR CAMERA

BACKGROUND OF THE INVENTION

1. Field of the Invention

The present invention relates to a motor actuation device for a camera, and more particularly to a motor actuation device including a photo sensor for detecting the amount of a rotation caused by a motor in a photoelectrical manner.

2. Description Related to the Prior Art

In a camera, a motor actuates to move a whole or a part of a taking lens along an optical axis for zooming and focusing. When zooming or focusing is carried out, a lens barrel or a lens holder moves and contacts a brush and a slide segment to generate electric signals. The electric signals are used for monitoring. In order to know the amount of the movement more correctly, it is often detected by a photo detector. The Japanese Patent Laid-Open Publication No. H9-274229 discloses a motor actuation device. In the motor actuation device, a motor gear for driving a lens moving mechanism is fixed at an end of a rotary shaft of motor, and an impeller is fixed at another end of the rotary shaft. A rotation of the impeller is detected by a photo interrupter, and the amount of the rotation is calculated in accordance with detection signals from the photo interrupter.

It is effective to decelerate rotation between a motor gear fixed to a motor shaft and a first gear meshed with the motor gear in order to drop a sound of the motor actuation device. In the Japanese Patent Laid-Open Publication No. H5-11322, a worm gear is fixed to the rotary shaft of the motor, and meshed with a worm wheel. The worm wheel rotates more slowly than the worm gear.

It is difficult to fix an impeller of a large diameter to the worm gear. When the worm gear fixed on the rotary shaft drives the worm wheel, the worm wheel is located near the rotational axis of the motor. Furthermore, the impeller is hardly to fix to a rotary shaft of the motor without collapsing the worm wheel, because it is necessary to keep a space therefore. Accordingly, the impeller is usually provided for the gear train following the worm wheel. However, in this structure, the amount of rotation of the rotary shaft of the motor is not correctly detected because the rotation of the impeller is reduced.

Preferably, the impeller is not disposed after the speed accelerate gear train, in order to keep the number of the gears so small that the cost may be low, and the amount of back crush between the gears be decreased, which causes the incorrect detection for the amount of the rotation of rotary shaft. As disclosed in Japanese Patent Laid-open Publication No. H9-274229, the impeller can be fixed to another end of the rotary shaft. However, in this structure, the motor is specifically produced, which increases the cost. Further, a space along the rotary shaft is necessary.

SUMMARY OF THE INVENTION

In view of the forgoing, an object of the present invention is to provide a motor actuation device whose cost for production is low, and which is loaded in a small space.

Another object of the present invention is to provide a motor actuation device which can precisely detect an amount of rotation caused by a motor.

A second object of the present invention is to provide a motor actuation device in which a reduction mechanism including a worm gear is used and rotational speed is reduced so much.

In order to achieve the above objects, a motor actuation device of the present invention causes to rotate a impeller. A blade of the impeller is detected by the photo sensor. The worm gear is fixed to a rotary shaft of the motor, and a first spur gear is fixed to the rotary shaft. The idle gear is meshed with the first spur gear and the second spur gear of the impeller. When the motor drives, the worm gear and the first spur gear rotate. The rotation of the worm gear is transmitted through the worm wheel to the photographic mechanism. The photo sensor detects the blade and generates the pulse when the impeller rotates at a predetermined angle.

The first spur gear is integrally formed with the worm gear. As the first spur gear has a smaller diameter than the worm gear, the first spur gear does not collide with the worm wheel.

The worm wheel is molded integrally with the spur gear portion whose diameter is smaller than that of the worm wheel. The rotation of the spur gear portion is transmitted through the gear train to a camera mechanism.

According to the present invention, the rotation caused by the motor is transmitted with a small number of gears. And the small reduction ratio makes the amount of the rotation of the motor precisely detected. The small number of gears decreases the cost.

BRIEF DISCRIPTION OF THE DRAWINGS

The above objects and advantages of the present invention will become easily understood by one of ordinary skill in the art when the following detailed description would be read in connection with the accompanying drawings.

PREFERRED EMBODIMENTS OF THE INVENTION

Figure 1:
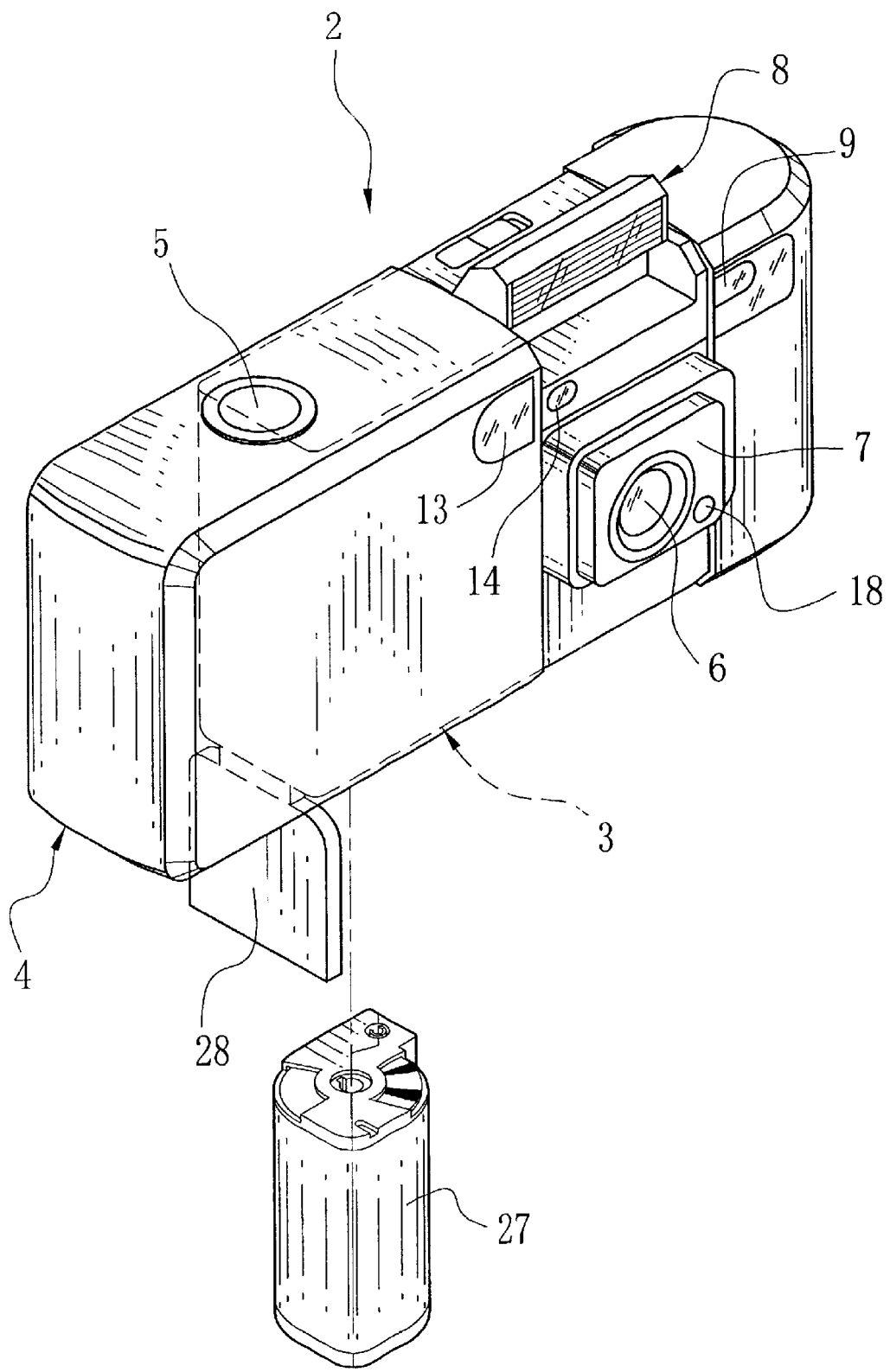
FIG. 1 is a perspective view of a camera illustrating a situation when a slide case is opened.

In FIG. 1, the camera 2 includes a camera body 3, a slide case 4 and a shutter button 5. In the camera body 3, several parts of the camera 2 are disposed with arrangement. The slide case 4 is slidable between a photographic position in FIG. 1 and a close position (see FIG. 2) and covers the camera body 3. The shutter button 5 is disposed on an upper face of the slide case 4.

The front and upper faces of the camera 2 are provided with a lens barrel 7, a flash unit 8, a light receiving window 9, a light emitting window 13 and a objective finder window 14. The lens barrel 7 includes a first barrel section 7a and a second barrel section 7b, holds a taking lens 6 therein, and in the front side thereof, a photometric window 18 is formed. The flash unit 8 is swingable between an exposure position in FIG. 1 and a retracted position (not shown) in which the exposure unit 8 is retracted in the camera body 3. The camera body 3 further includes a film cartridge room (not shown) in a side covered with the slide case 4. The film cartridge room is opened and closed with a lid 28 rotatably fixed on a bottom face of the camera body 3. In another side, the camera body 3 has a film roll chamber (not shown) in which a photo film 29 (see FIG. 4) advanced from a film cartridge 27 is rolled.

Figure 2:
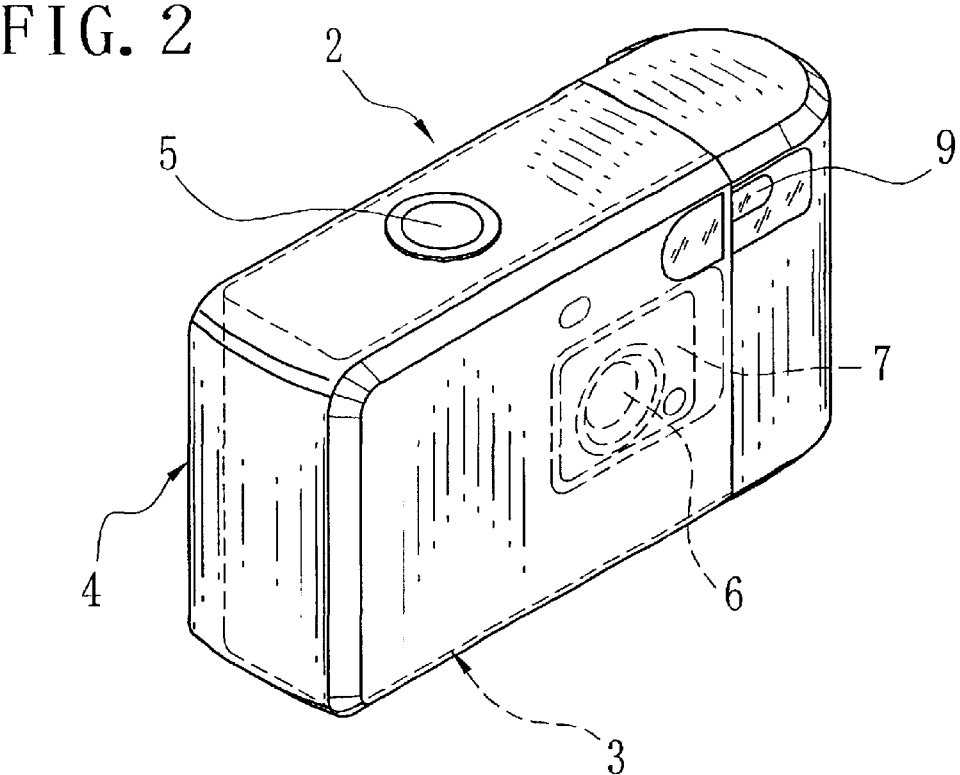
FIG. 2 is a perspective view of the camera illustrating a situation when the slide cover is closed.

As shown in FIG. 2, when no picture is photographed and the almost of the camera body 3 is covered with the slide case 4, and parts formed on the camera body 3 is behind the slide case 4. Thus, a periphery of the camera 2 has neither protrusion nor retraction, and the camera 2 becomes compact and more portable.

When a picture is photographed, the slide case 4 is slid from the closed position to the photographic position, and the flash unit 8 pops up to the exposure position by bias of a spring. In accordance with the positioning of the flash unit 8 in the exposure position, the switch of the camera body 3 turns ON. And the slide case 4 is used as a grip portion to easily hold the camera 2 with a hand of a photographer.

Figure 3:
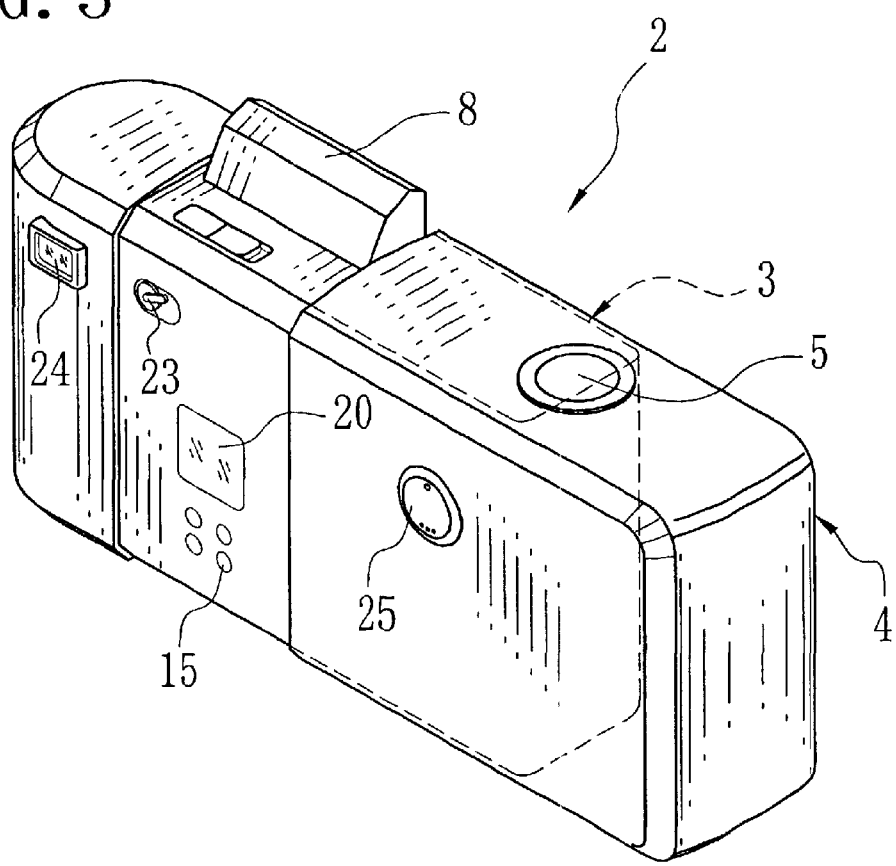
FIG. 3 is a perspective view of the camera from a rear side.

As shown in FIG. 3, a rear face of the camera body 3 is provided with a liquid crystal display (LCD) 20 for displaying information, a panel switch 15 operated for setting of the camera 2, a CHP operation member 23 operated for changing an aspect ratio, and a viewfinder eyepiece window 24. A rear face of the slide case 4 has a zooming button 25 of a nearly-circular shape. The zooming button is opposed to a zooming switch (not shown) disposed on the rear face of the camera body 3 when the slide case 4 is slid in the photographic position. The zooming switch is operated by pressing the zooming button 25, and a magnification of a optical system arranged in the lens barrel 7 is changed.

Figure 4:
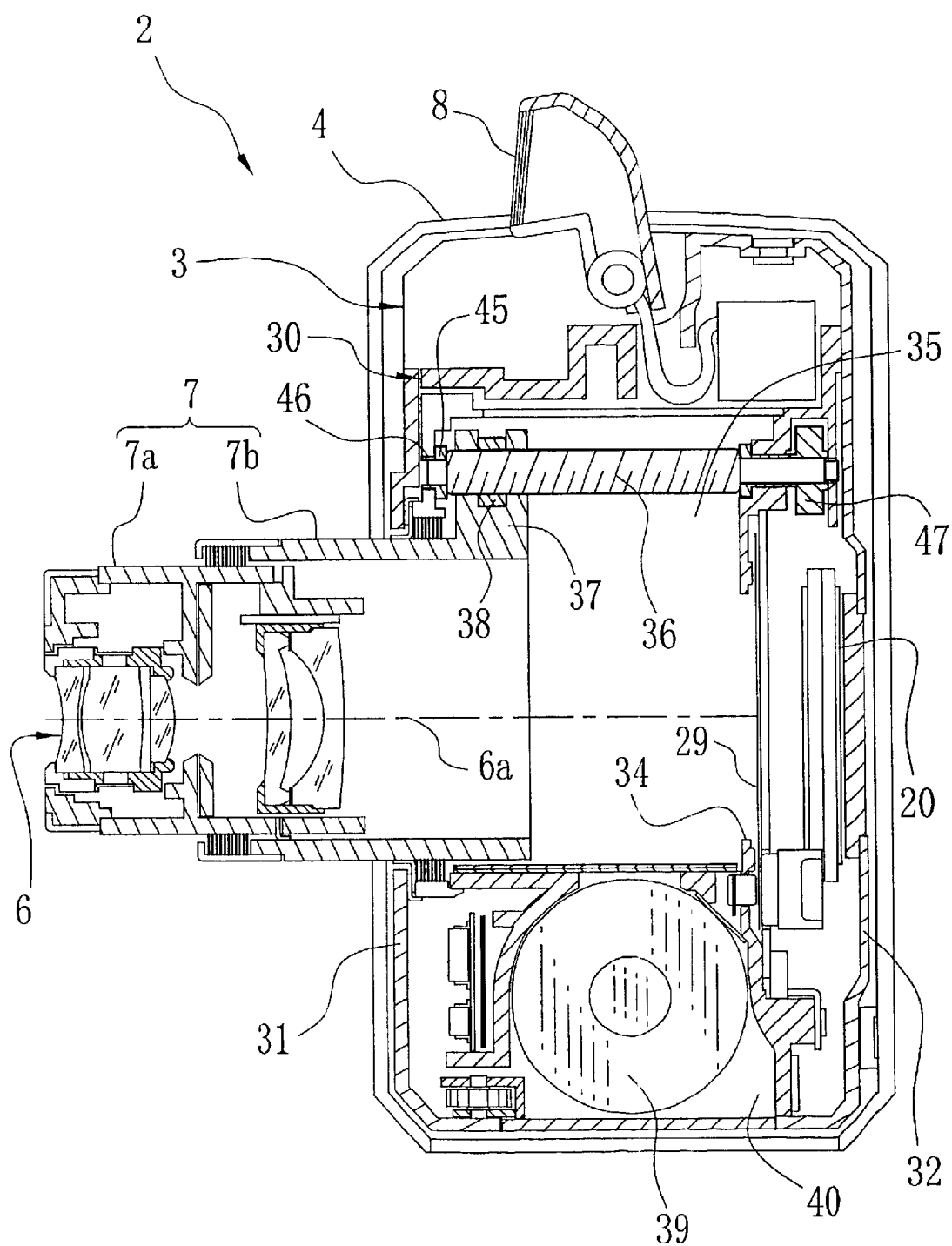
FIG. 4 is a sectional view of the camera.

As shown in FIG. 4, the camera body 3 is constituted of a main body 30, photomechanical parts, electric parts, a front decorate cover plate 31 and a rear decorate cover plate 32. The photomechanical parts and the electric parts are provided in the main body 30, and the front and rear decorate cover plates 31, 32 are respectively attached on the front and rear faces of the main body 30. An aperture 34 is formed inside the main body 30, and there is a lens barrel retraction space 35 in front of the aperture 34. In the lens barrel retraction space 35, the lens barrel 7 is positioned when the switch of the camera body 3 is turned OFF.

An upper side of the lens barrel retraction space 35 is provided with a feed screw 36 constituting a lens moving mechanism 42. The feed screw 36, whose end is contacted to a rotary pin 45, is rotatably fitted in a pin hole 46 formed on the main body 30, and connected through a nut 38 with a connection section 37 formed at an end of the second barrel section 7b. The second barrel section 7b moves in accordance with operating the zooming button 25 or turning the switch of the camera body 3 in ON/OFF positions. Further, between the first barrel section 7a and the second barrel section, a not shown interlocking mechanism is disposed. The interlocking mechanism moves the first barrel section 7a to a predetermined position corresponding to the amount of the moving of the second barrel section 7b. In the lower side of the lens barrel retraction space 35, a battery room 40 is formed for containing the battery 39 which is a power source of the camera 2.

Figure 5:
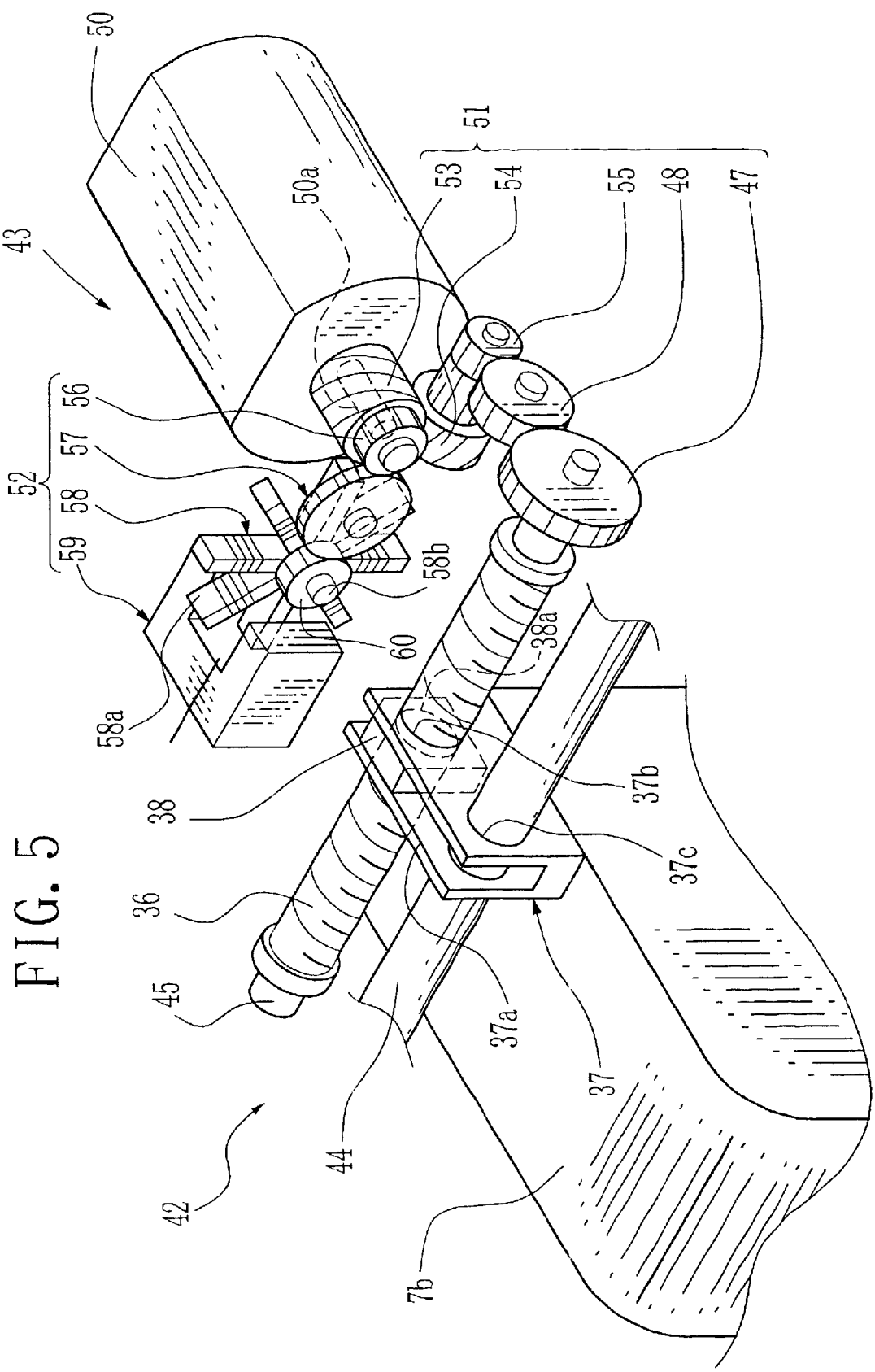
FIG. 5 is a perspective view illustrating an embodiment of the motor actuation device of the present invention.

As shown in FIG. 5, a motor actuation device 43 is constructed of the lens moving mechanism 42, a motor 50, a reduction gear train 51 and a detection mechanism 52. The lens moving mechanism 42 is constructed of the second barrel portion 7b, the feed screw 36, a connection section 37 and a guide rod 44. The connection section 37 is constituted of a groove member 37a and the nut 38 whose periphery is nearly rectangular. The connection section 37 has a screw hole 37b through which the feed screw 36 penetrates, and the nut 38 is engaged with the groove member 37a. The nut 38 has a hole (not shown) at a position corresponding to the screw hole 37b. On an edge face of the hole, a female screw portion is formed such that the feed screw 36 is fixedly engaged with the nut 38.

The connection section 37 has a guide hole 37c in which the guide rod 44 is slidably fitted. The guide rod 44 is disposed in parallel to an optical axis 6a of the taking lens 6, and fixed to the main body 30 such that the nut 38 may slide along the optical axis 6a without rotating around the feed screw 36. A transmit gear 47 is attached to a back end of the feed screw 36, and transmits the rotation caused by the motor 50 to the feed screw 36.

The reduction gear train 51 is constructed of the transmit gear 47, the gear 48, a worm gear 53, a worm wheel 54 and a spur gear portion 55. The worm gear 53 is secured to the rotary shaft 50a and meshed with the worm wheel 54. The worm wheel 54 is disposed below the worm gear 53, and a fixture shaft of the worm wheel 54 is disposed in parallel to the optical axis 6a. The spur gear portion 55 is integrally molded with the worm wheel 45, and the gear 48 is meshed with the spur gear portion 55 and the transmit gear 47. Therefore, the rotation caused by the motor 50 is transmitted to the transmit gear 47. According to diameters, the worm wheel 54 has a larger one than the worm gear 53, and the diameters become larger one by one in following, such as the spur gear portion 55, the gear 48 and the transmit gear 47. Thus, the rotational speed is reduced in the reduction gear train 51. Note that some members are not illustrated in FIG. 5 for simplicity.

Figure 6:
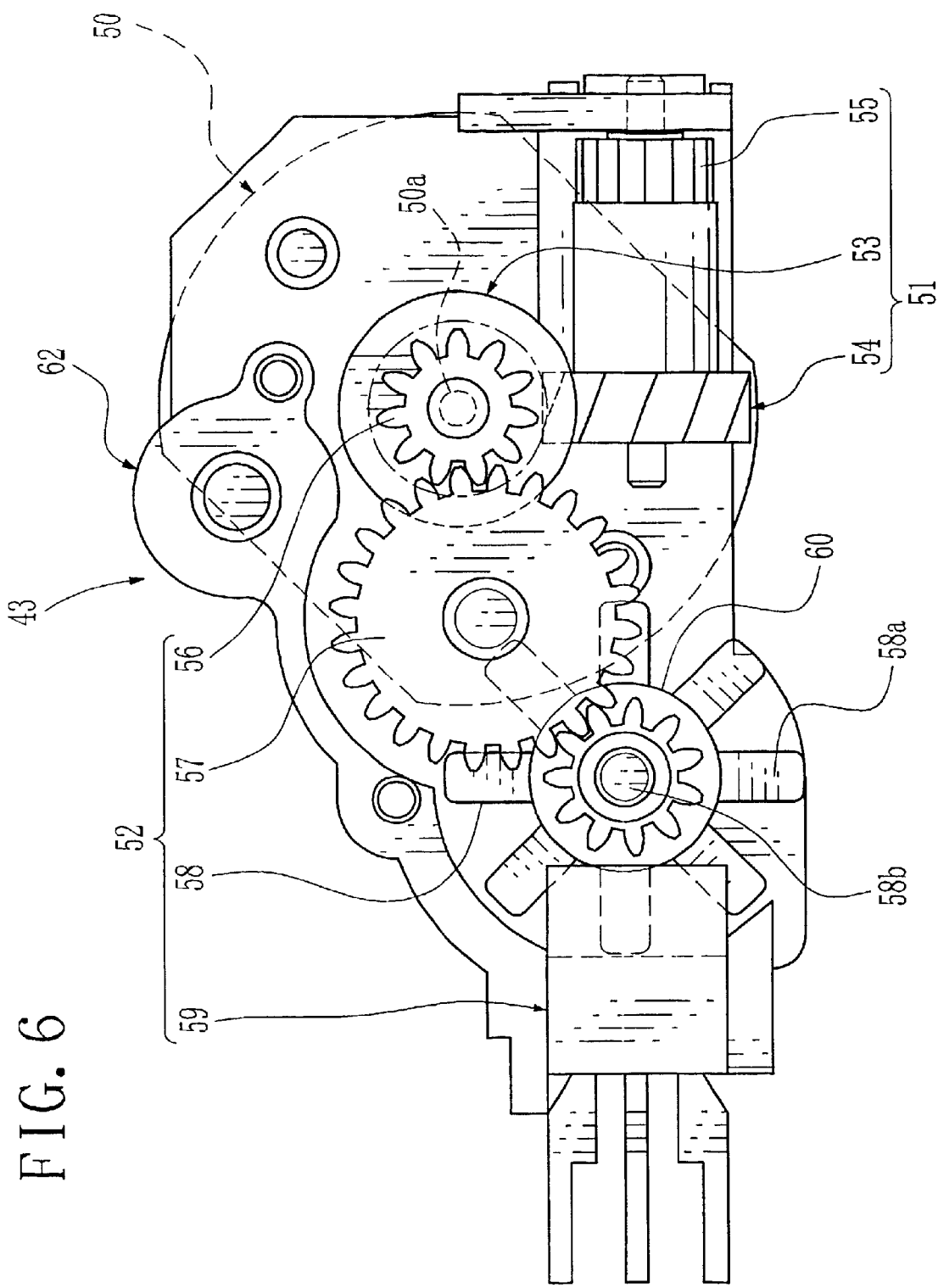
FIG. 6 is a plain view of the motor actuation device.

In FIG. 6, the detection mechanism 52 is constructed of a spur gear 56, an idle gear 57, an impeller 58, a spur gear 60 and a photo interrupter 59. The spur gear 56 is integrally molded with the worm gear 53, and disposed in an opposite side to the motor 50. The idle gear is meshed with the spur gear 56 and the spur gear 60. The impeller 58 has blades 58a and a rotary shaft 58b. The spur gear 60 is fixed to the rotary shaft 58b, and has a same diameter and a same number of teeth of the spur gear 56. Therefore, the impeller 58 is interlocked by the idle gear 57 to rotate at a same rotational speed of rotary shaft 50a of the motor 50, and does not collide with the idle gear 57. The photo interrupter 59 has a retraction where the blades 58a can pass.

When the blade 58a interrupts a light path of the photo interrupter 59 by the rotation of the impeller, the photo interrupter 59 outputs a signal "L". When the blade 58a does not interrupt the light path, the photo interrupter outputs a signal "H". Therefore, a pulse is generated every time from the photo interrupter 59 when one of the blades interrupts the light path. The number of pulses is counted to detect the amount of the rotation caused by the motor 50.

Figure 7:
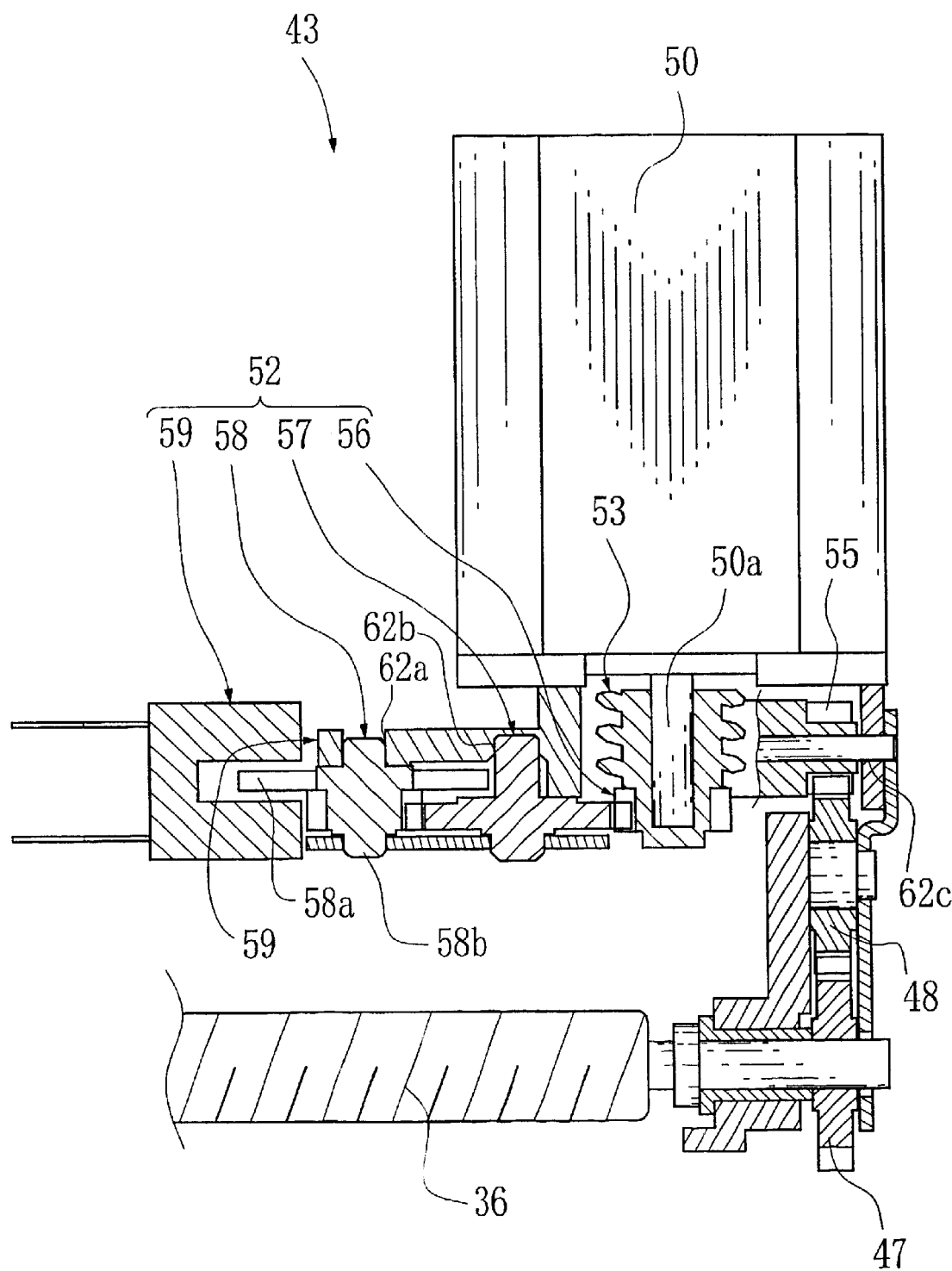
FIG. 7 is a sectional view of the motor actuation device.

A diameter of the idle gear 57 is larger than that of both the spur gear 56 and the spur gear 60, such that these are disposed with a enough distance in order to keep a space for the impeller 58. As shown in FIG. 7, the worm wheel 54, the idle gear 57 and the impeller 58 are rotatably secured to holes 62a, 62b, 62c in a holder plate 62 that is formed of plastics respectively.

The effects of the above structure will be described. When a picture is photographed, the slide case 4 is slid to turn the switch of the power source in ON position. The motor 50 causes to rotate the worm gear 53 and the spur gear 56. The rotation of the warm gear 53 is transmitted to the lens moving mechanism 42, which slides the second barrel section 7b forward or backward along the optical axis 6a. The rotation of the spur gear 56 is transmitted through the idle gear to the impeller 58, and when the impeller 58 rotates, the pulse is generated from the photo interrupter 59. When the predetermined number of the pulse is counted, the motor 50 stops such that the second barrel portion 7b may be in a predetermined position.

The rotation is decelerated in the reduction gear train 51. Therefore, while the lens moving mechanism 42 moves the second lens barrel 7b, the noise is little. Further, the impeller 58 rotates at the same rotational speed of the rotary shaft 50a of the motor 50, the second barrel section 7b is correctly slid in the predetermined position. As shown in FIGS. 6 and 7, the lengthwise direction of the feed screw 36 is perpendicular to the rotary shaft 50a of the motor 50, and the feed screw 36 and the motor 50 don't collide. Further, the all gears constructing the reduction gear train 51 and the detection mechanism are fixed to the holder plate 62. Thus, the motor actuation device can be contained in a small space.

When the zooming button 25 is operated, the motor 50 causes a normal or reverse rotation to shift the lens barrel 7b. When a finger is put apart from the zooming button 25, the motor stops and the photo optical system is set to a position corresponding to a magnification to be wished. After a picture is photographed, an user presses down the flash unit 8, and a switch of the camera is turned OFF. The motor 50 causes the reverse rotation to retract the lens barrel 7b in the retracted position. Then, the slide case 4 can be slid to the cover position.

In the above embodiment, the spur gears 56, 60 have a same diameter. However, the spur gear 60 may have a smaller diameter than the spur gear 56 to increase the number of pulse for one rotation of the rotary shaft 50a of the motor 50. Because when the impeller rotates faster, the amount of the rotation of the rotary shaft 50a is detected more correctly.

In the above embodiment, the spur gear is formed integrally with the worm gear. However, they may be separately molded and fixed to each other with a screw. Further, the spur gear may be disposed nearer to the motor than the worm gear. Furthermore, instead of the photo interrupter, another types of photo sensors may be used, in which, for example, the reflected light is received for detecting the amount of rotation of the rotary shaft.

In the above embodiment, the lens moving mechanism is actuated by the motor. However, the motor can actuate another photo mechanism, for example, a mirror up and down mechanism, or a film advancing mechanism.

In the above description, the camera body 3 is covered with the slide case 4. However, the present invention may be applied to a camera having no the slide case. Further, not only the IX240 type of the photo film is loaded in the camera, but also a 135 type, a middle format film (120 type or 220 type) and a film sheet unit. Furthermore, the motor actuation device is not only applied in the camera but also in another apparatus including a mechanism or a device through which the motor causes to move a predetermined section, for example an image formation device including a printer head.

Various changes and modifications are possible in the present invention and may be understood to be within the present invention.

What is claimed is:

1. A motor actuation device for actuating an actuated section by a motor, said motor having a rotary shaft to which a worm gear is fixed, a rotation of said worm gear is transmitted through a worm wheel to said actuated section, said motor actuation device comprising:

a first spur gear fixed to said rotary shaft of the motor;

an idle gear being meshed directly with said first spur gear;

a second spur gear being directly meshed with said idle gear;

an impeller fixed to said second spur gear, said impeller having a plurality of blades which are disposed at a same interval;

a photo sensor for detecting said blade, said photo sensor generating a pulse to calculate an amount of the rotation of said rotary shaft of the motor.

2. A motor actuation device according to claim 1, wherein said first spur gear is integrally formed with said worm gear.

3. A motor actuation device according to claim 2, wherein a diameter of said first spur gear is smaller than that of said worm gear.

4. A motor actuation device according to claim 3, wherein said second spur gear is integrally formed with said impeller.

5. A motor actuation device according to claim 4, wherein said first spur gear and said second spur gear have a same number of teeth.

6. A motor actuation device according to claim 5, wherein said photo sensor is a photo interrupter.

7. A motor actuation device according to claim 6, wherein a spur gear portion is integrally formed with said worm wheel, a rotation caused by said motor is transmitted through said spur gear portion to said actuated section.

8. A motor actuation device according to claim 7, wherein a diameter of said spur gear portion is smaller than that of said worm wheel.

9. A motor actuation device according to claim 8, wherein said actuated section is a lens moving mechanism.

10. The motor actuation device of claim 1, wherein a circle swept out by the blades of the impeller during rotation overlaps with the idle gear the meshes directly with the first spur gear fixed to the rotary shaft of the motor.

* * * * *